United States Patent
Tai et al.

(10) Patent No.: US 9,088,537 B2
(45) Date of Patent: *Jul. 21, 2015

(54) APPARATUS AND METHOD FOR EXECUTING AGENT

(71) Applicant: International Business Machines Corporation, Armonk, NY (US)

(72) Inventors: Hideki Tai, Yokohama (JP); Gaku Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,753

(22) Filed: Dec. 7, 2012

(65) Prior Publication Data

US 2013/0097219 A1 Apr. 18, 2013

Related U.S. Application Data

(63) Continuation of application No. 12/414,556, filed on Mar. 30, 2009, now Pat. No. 8,358,773.

(30) Foreign Application Priority Data

Mar. 28, 2008 (JP) .................. 2008-85972

(51) Int. Cl.
*H04M 3/00* (2006.01)
*H04M 5/00* (2006.01)
*H04L 29/08* (2006.01)
*H04M 3/51* (2006.01)

(52) U.S. Cl.
CPC ............. *H04L 67/00* (2013.01); *H04M 3/5175* (2013.01)

(58) Field of Classification Search
CPC . H04M 3/523; H04M 3/5183; H04M 3/5233; H04M 3/5232; H04M 3/5175

USPC .............. 379/266.01, 265.05, 265.11, 265.1, 379/265.14, 265.01; 709/226; 714/4.1
See application file for complete search history.

(56) References Cited

U.S. PATENT DOCUMENTS 6,449,646 B1 * 9/2002 Sikora et al. .................. 709/226
6,983,395 B2 * 1/2006 Chen et al. ..................... 714/4.1

FOREIGN PATENT DOCUMENTS

| JP | 4023137 A1 | 1/1992 |
| JP | 11327908 A | 11/1999 |
| JP | 2004192047 A | 7/2004 |
| JP | 2007213214 A | 8/2007 |

OTHER PUBLICATIONS

Terauchi, et al., "An Efficient Broadband Streaming Architecture Based on Self-Adaptive Agent Organization", Toyohashi Univ. of Tech., (post-2004), 10 pp.

* cited by examiner

*Primary Examiner* — Thjuan K Addy

(57) ABSTRACT

Methods for selecting an initial agent for an agent transaction context (ATC) are presented, the ATC configured to process a transaction utilizing a number of active agents in a multiagent system using a computing device including: causing the computing device to determine whether an agent having a top priority message is present, where the agent is one of the number of active agents in the multiagent system; if the agent having the top priority message is present, causing the computing device to determine whether the agent having the top priority message is processing; and if the agent having the top priority message is not processing, causing the computing device to select the agent having the top priority message as the initial agent for the ATC.

14 Claims, 9 Drawing Sheets

APPARATUS AND METHOD FOR EXECUTING AGENT

CROSS-REFERENCE TO RELATED APPLICATION

Under 35 USC §120, this application is a continuation and claims the benefit of priority to U.S. patent application Ser. No. 12/414,556 filed Mar. 30, 2009, entitled APPARATUS AND METHOD FOR EXECUTING AGENT, which claims priority to Japanese Patent Application No. 2008-85972, filed on Mar. 28, 2008, all of which is incorporated herein reference.

FIELD

The present invention relates to an apparatus and method that execute an agent. Particularly, the present invention relates to an apparatus and method that execute an agent in a multiagent system.

BACKGROUND

Recently, a multiagent technique is receiving attention as the Internet becomes popular (see, for example, Non-patent Document 1). A multiagent is a system in which multiple agents or programs that autonomously behave cooperate with one another to solve a problem. The Non-patent Document 1 proposes a video distribution technique using a multiagent and its organization for efficiently executing multiple types of video distributions to many and unspecified persons.

[Non-patent Document 1] Atsushi Terauchi, 6 others, "An Efficient Broadband Streaming Architecture based on Self-Adaptive Agent Organization", [online], Dec. 14, 2004, Japan Society for Software Science and Technology, Internet Technology Workshop, [searched on Mar. 15, 2008], Internet <URL:http://wit.jssst.or.jp/2004/WIT2004/WIT2004-terauchi.pdf.

In a business system using such a multiagent technology, in some cases, a plurality of agents cooperate to execute one transaction (hereinafter, a transaction to be executed in such a way is called "cooperative transaction"). However, a transaction processing mechanism in such a system has not been proposed. Without such a mechanism, one transaction needs to be separated into a plurality of transactions. This involves a method of carrying out rollback of transactions based on compensation transaction. This method is complicated, and leads to an increase in the number of development steps. Therefore, a cooperative transaction mechanism which can allow a plurality of agents to execute one transaction is necessary.

SUMMARY

Accordingly, it is desirable to provide a multiagent system which allows a plurality of agents to cooperate to execute one transaction. As such, methods for selecting an initial agent for an agent transaction context (ATC) are presented, the ATC configured to process a transaction utilizing a number of active agents in a multiagent system using a computing device including: causing the computing device to determine whether an agent having a top priority message is present, where the agent is one of the number of active agents in the multiagent system; if the agent having the top priority message is present, causing the computing device to determine whether the agent having, the top priority message is processing; and if the agent having the top priority message is not processing, causing the computing device to select the agent having the top priority message as the initial agent for the ATC, where the ATC includes at least an agent list and an intra-transaction message queue, where the agent list includes at least some of the number of active agents required for executing a number of threads, where the intra-transaction message queue is configured to store a number of one-directional messages, and where the number of one-directional messages are associated with the transaction. In some embodiments, methods further include: if the agent having the top priority message is not present, causing the computing device to determine whether any of the number of active agents has been processing previously; and if any of the number of active agents has been processing previously, causing the computing device to select a previously processing agent as the initial agent for the ATC. In some embodiments, selecting another of the number of active agents includes: causing the computing device to determine whether any of the number of active agents has an unprocessed message; and if any of the number of active agents has an unprocessed message, causing the computing device to select an agent having the unprocessed message as the initial agent for the ATC.

In other embodiments computing device program products for selecting an initial agent for an agent transaction context (ATC) are presented, the ATC configured to process a transaction utilizing a number of active agents in a multiagent system using a computing device including: a computer readable medium; first programmatic instructions for causing the computing device to determine whether an agent having a top priority message is present, where the agent is one of the number of active agents in the multiagent system; if the agent having the top priority message is present, second programmatic instructions for causing the computing device to determine whether the agent having the top priority message is processing; and if the agent having the top priority message is not processing, third programmatic instructions for causing the computing device to select the agent having the top priority message as the initial agent for the ATC, where the ATC includes at least an agent list and an intra-transaction message queue, where the agent list includes at least some of the number of active agents required for executing a number of threads, where the intra-transaction message queue is configured to store a number of one-directional messages, and where the number of one-directional messages are associated with the transaction. In some embodiments, if the agent having the top priority message is not present, fourth programmatic instructions for causing the computing device to determine whether any of the number of active agents has been processing previously; and if any of the number of active agents has been processing previously, fifth programmatic instructions for causing the computing device to select a previously processing agent as the initial agent for the ATC. In other embodiments, before the fifth programmatic instructions for causing the computing device to select the previously processing agent, sixth programmatic instructions for causing the computing device to determine whether a number of successive processes of the previously processing agent exceeds a given value; and if the number exceeds the given value, selecting another of the number of active agents. In some embodiments, selecting another of the number of active agents includes: seventh programmatic instructions for causing the computing device to determine whether any of the number of active agents has an unprocessed message; and if any of the number of active agents has an unprocessed message, eighth programmatic instructions for causing the computing device to select an agent having the unprocessed message as the initial agent for the ATC.

DETAILED DESCRIPTION

Figure 1:
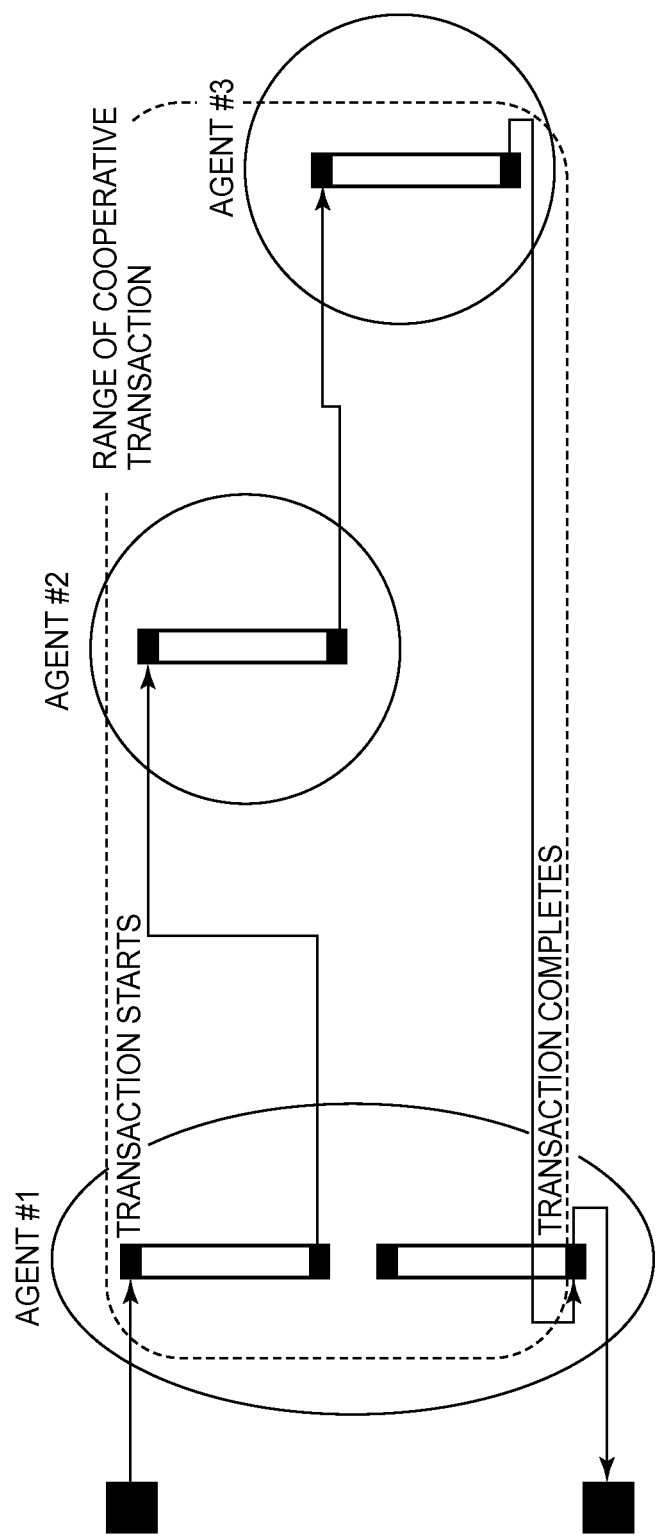
FIG. 1 is a diagram showing a first example of a cooperative transaction which is used to explain a problem to be solved by an embodiment of the present invention.

A best mode for carrying out the present invention (hereinafter, "embodiment") will be described below by way of examples referring to the accompanying drawings.

First, a massively multiagent system (MMAS) on which the embodiment is premised will be described. The MMAS is a programming model in which multiple agents cooperate to execute tasks. Under the MMAS execution environment, several hundred thousand agents perform message processes. Accordingly, an agent starts a process upon reception of a message (message driven). A message is transmitted from an external system or an agent and is stored in a message queue in an agent execution environment. In the agent execution environment, a thread in a thread pool is assigned to an agent at a proper timing and caused to execute a message process. Then, the message process of the agent is completed in a short period of time. The MMAS is an asynchronous messaging model in which an agent cannot wait for a message from another agent. Each agent is independent and does not depend on the behaviors of the other agents.

Normally, a transaction corresponds only to a message process of a single agent. That is, a message process corresponds in one to one to a transaction. In the MMAS, however, a plurality of agents which behave in the same agent execution environment may cooperate to execute one transaction. When a user agent and a shop agent execute a purchase process in an electronic commerce application, for example, the user agent transmits a purchase request for a commodity in a cart the user agent has to the shop agent. In this process, deletion of an entry from the cart by the user agent and recording of the purchase request by the shop agent need to be executed in one transaction. The transaction model in which the aforementioned message process and transaction correspond in one to one to each other cannot achieve such a process.

In case where the cooperative process by agents is a transaction, the following problems arise.

The first problem is a "transaction completion problem". Because each agent autonomously executes processes, the agent calls another agent independently. Therefore, participating agents cannot know completion of the general cooperative process or completion of the transaction.

The second problem is a "thread problem". Message processes by agents which participate in a transaction process need to be processed in the same thread.

The first problem will be described in detail. A cooperative process by agents is carried by messaging. The types of messaging are a request reply message and a one directional message. The former type is the messaging which receives a reply message as a return value of an API for transmitting a request reply message. In this case, the reply message is received when a destination agent completes a transmission message process. The latter type is the messaging in which there is no return value for the API for transmitting a one-directional message. In this case, a transmitted message is temporarily stored in a message queue, so that the API may return to the original process before the destination agent processes the message.

Because an agent autonomously executes processes, agents which participate in a cooperative transaction are determined dynamically. Suppose that, for example, an agent A has started a cooperative transaction and transmitted a request reply message to an agent B. Then, suppose that the agent B has transmitted the request reply message to an agent C and has returned a reply message to the agent A in the message process, and the agent C has transmitted a one-directional message to an agent D. In such a case, while the cooperative transaction is carried out by the agents A, B, C and D, the agent A cannot know the participation of the agents C and D. The agent B cannot know the participation of the agent D. The agent C cannot know the participation of the agent A. Further, the agent D cannot know the participation of the agents A and B.

Next, the second problem will be described in detail. Normally, in the MMAS, when the agent execution environment carries out a message process of an agent, a thread in a thread pool is assigned to the agent, and when the message process is completed, the thread is freed from the agent. Accordingly, when a plurality of agents execute a cooperative transaction, different threads are assigned to the individual agents. If it is not a transaction process, a problem does not arise in such thread assignment. In case of a transaction process, however, since many commercial database management systems associate threads with transactions in one to one base, a single transaction cannot extend over a plurality of threads.

The problems to the solved will be described specifically referring to the accompanying drawings.

FIG. 1 schematically shows problems to be solved. As has been described already one problem to be solved is that while a plurality of agents cooperatively execute a single process, the process cannot be executed as a single transaction.

As the first problem, as described above, a plurality of agents cannot process in the same thread. FIG. 1 shows an example where an agent #1 which has started a transaction transmits a message to an agent #2, the agent #2 transmits a message to an agent #3, and the agent #3 returns a message to the agent #1. In this example, the thread assigned to the agent #1 when the transaction has started is freed from the agent #1 when a message is transmitted to the agent #2 and the process is terminated. The threads respectively assigned to the agents #2, #3 are freed when the message process is completed. As a message process is terminated, the thread is returned to the system, thus arising the foregoing problem.

As the second problem, as mentioned above, the agent which has started a transaction does not know when the transaction is completed. In FIG. 1, after the agent #1 processes a message received from the agent #3, the agent #1 is to complete the transaction; however, actually, the agent #1 does not know whether it should complete the transaction here. This is because the agent #3 might have not only returned a message to the agent #1 but also have transmitted a message to another agent.

Figure 2:
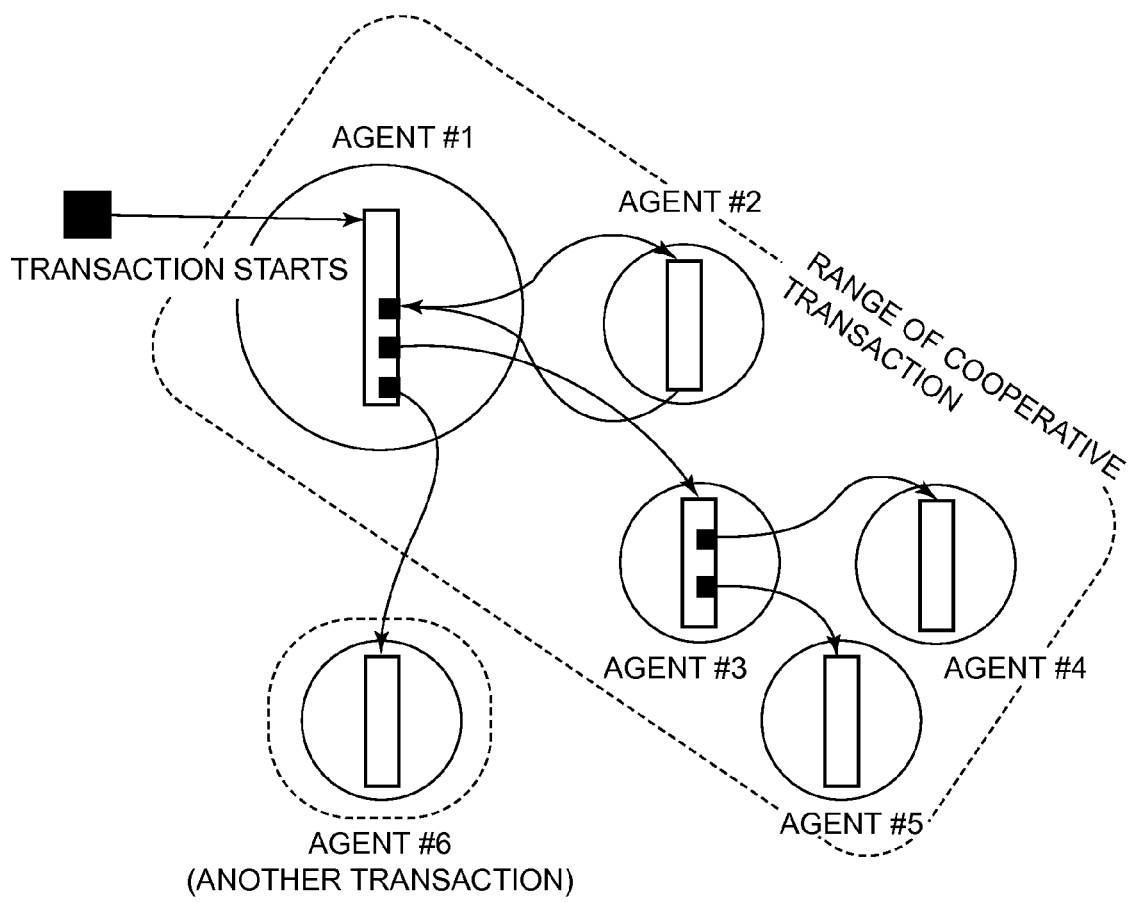
FIG. 2 is a diagram showing a second example of a cooperative transaction which is used to explain a problem to be solved by an embodiment of the present invention.

FIG. 2 shows another example of the cooperative transaction. In this example, the agent #1 transmits a request reply message to the agent #2, receives a reply message from the agent #2, then transmits a one-directional message to the agent #3. Then, the agent #3 transmits a one-directional message to the agent #4, and then transmits a one-directional message to a agent #5 too. In this case, after sending a message to the agent #3, the agent #1 does not receive a reply message, and cannot thus know to which agent the agent #3 has transmitted a message. This example therefore is a typical example where it is unknown when a transaction is to be completed. An agent in a cooperative transaction may transmit a message to an agent in another transaction, so that FIG. 2 shows transmission of a message from the agent #1 to an agent #6 in another transaction.

To overcome the problem, a message mechanism is provided with an intra-transaction message mechanism and an out-of-transaction message mechanism according to the embodiment, and the following three mechanisms are provided as the intra-transaction message mechanism.

The first mechanism is an agent transaction context thereinafter referred to as "ATC") which has a mechanism of making a list of information specifying agents to participate in a transaction and a counter mechanism of counting one-directional messages in a transaction.

The second mechanism is a mechanism of processing a message process in an intra-transaction message in the same thread.

The third mechanism is a mechanism of terminating a transaction when the counter mechanism in the ATC determines that there is no unprocessed message.

In the MMAS, not every agent is placed in a cache, so that some agents may be cast out from the cache. In a cooperative transaction, however, an agent which is participating in an uncommitted transaction cannot be cast out from the cache. In the embodiment, therefore, the status of the agent that has participated in a transaction is set to "processing" to prevent the agent from being cast out from the cache. When the transaction is terminated, the status of the agent, "processing", is deleted.

The outline of the embodiment will be described referring to the accompanying drawings.

Figure 3:
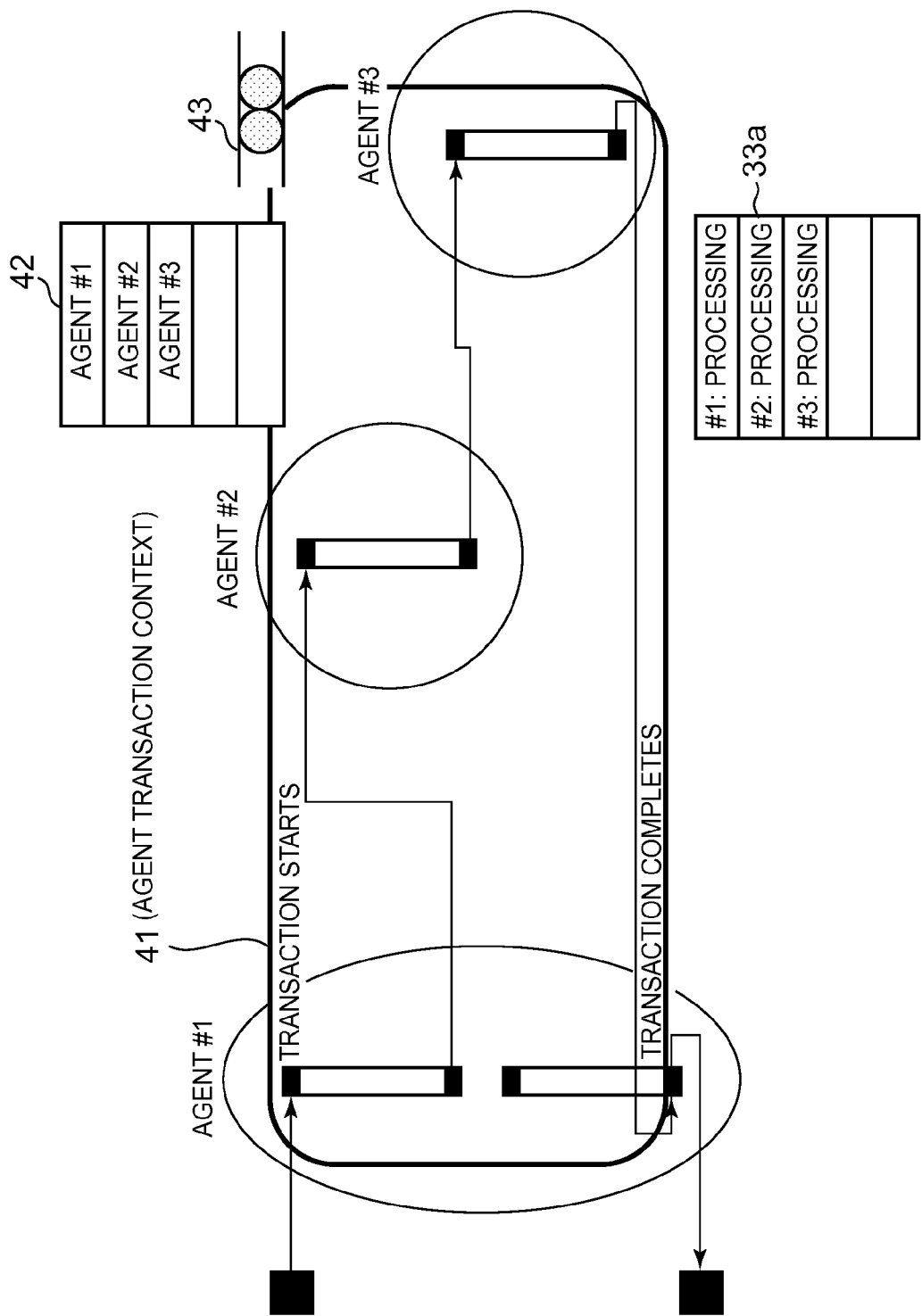
FIG. 3 is a diagram showing the outline of the embodiment of the present invention.

FIG. 3 schematically shows the outline of the embodiment. FIG. 3, like FIG. 1, shows an example where an agent #1 which has started a transaction transmits a message to an agent #2, the agent #2 transmits a message to an agent #3, and the agent #3 returns a message to the agent #1. In this example, those processes are executed in one thread using the aforementioned mechanisms. An ATC 41 is generated for the thread. It is illustrated that the ATC 41 has an agent list 42 to list agent IDs as one example of the mechanism that makes a list of information specifying agents which participate in a transaction. It is also illustrated that the ATC 41 has an intra-transaction message queue 43 which temporarily stores one-directional messages in a transaction as one example of the counter mechanism that counts one-directional messages in a transaction. FIG. 3 further shows agent status information 33a indicating whether the status of an agent is "processing".

A computer system which realizes the embodiment will be described in detail.

Figure 4:
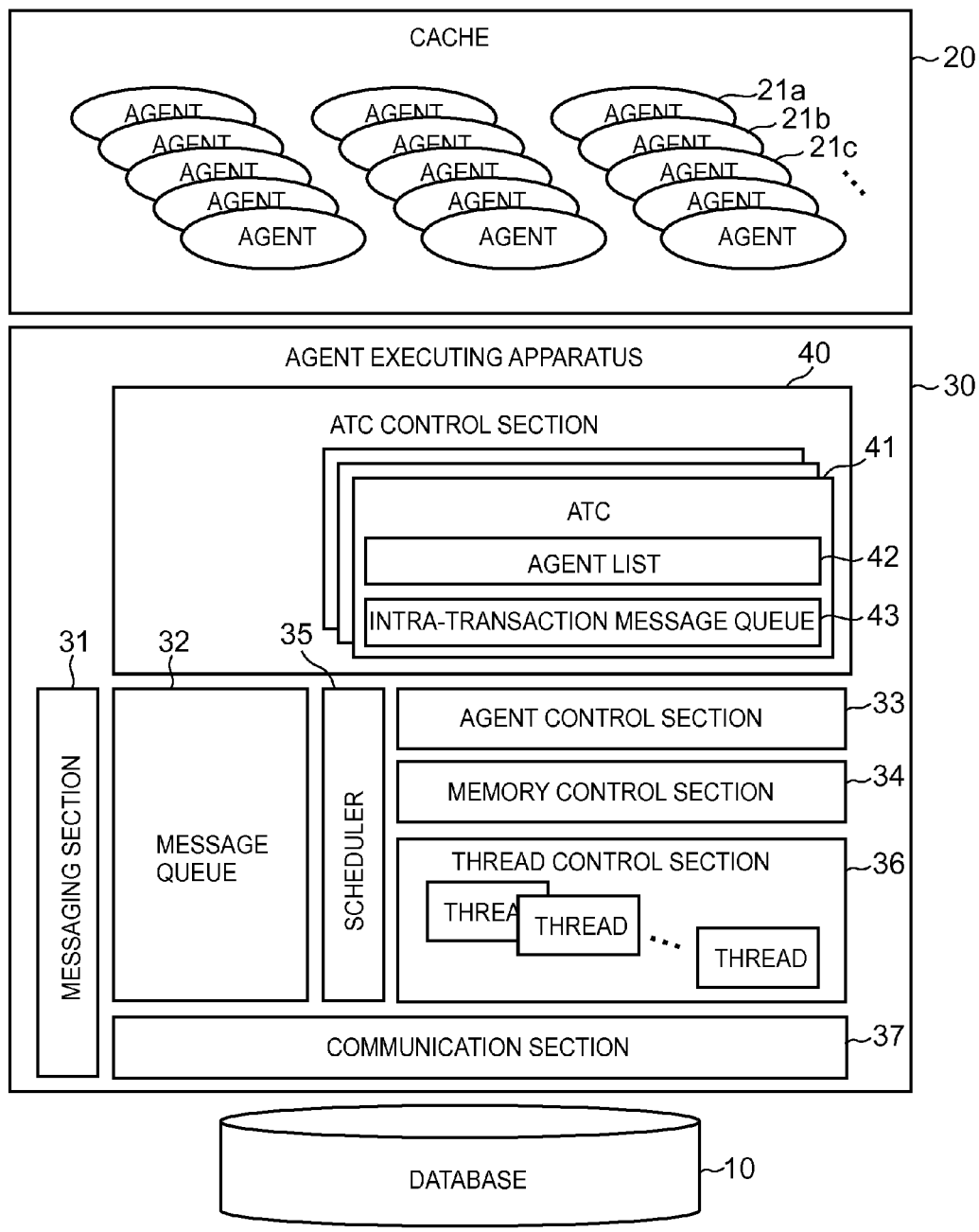
FIG. 4 is a block diagram showing an example of a functional structure of a computer system according to the embodiment of the present invention.

FIG. 4 is a block diagram showing an example of the functional structure of the computer system according to the embodiment. The computer system includes a database 10, a cache 20 and an agent executing apparatus 30.

Of the components, the database 10 is one example of a permanent storage device that stores agents before becoming a running state, and, specifically, it may be a relational database, an object oriented database, a file system or the like. When a relational database is used as the database 10, an object/relational mapping function is needed. The database 10 may be realized by, for example, a magnetic disc device. In the embodiment, the database 10 is provided as one example of the first storage section to store individual agent at a pre-execution stage.

The cache 20 can be considered as work space for agents, and is a memory to store active agents 21a, 21b, 21c, and so on. The cache 20 may be realized by, for example, a semi-conductor memory. When the agents 21a, 21b, 21c, etc, are not to be distinguished in the following description, they are simply denoted as "agents 21". in the embodiment, the cache 20 is provided as one example of the second storage section which stores individual agents at an execution stage.

The agent executing apparatus 30 is a computer in which the agent execution environment is constructed. The agent executing apparatus 30 manages a plurality of agents 21, and controls the activities thereof. The agent executing apparatus 30 performs message exchange with an external unit, and provides functions of generating and deleting the agents 21. The agent executing apparatus 30 may be realized by a general-purpose server computer, for example.

The functions of the agent executing apparatus 30 will further be described in detail.

The agent executing apparatus 30 has a messaging section 31, a message queue 32, an agent control section 33, a memory control section 34, a scheduler 35, a thread control section 36, and a communication section 37. The agent executing apparatus 30 further has an ATC control section 40, which manages the ATC 41. The ATC 41 includes the agent list 42 and the intra-transaction message queue 43.

The messaging section 31 adds an external message to the message queue 32 according to the type of the message. Message types include, for example, a destination specified message and a destination unspecified message in addition to the aforementioned request reply message and one-directional message. The destination specified message is a message whose message sender has specified an agent 21 to be a destination agent. The destination unspecified message is as message whose message sender has not specified an agent 21 to be a destination agent, in which case the application performs a process of specifying a destination agent using components registered in the messaging section 31.

The message queue 32 is a memory area to temporarily hold a message transmitted to an agent. The message queue 32 also has a function of managing the messaging type of each message. Further, the message queue 32 temporarily stores a message transmitted by an agent 21 outside a transaction.

The agent control section 33 manages the statuses of agents 21. The statuses of the agents 21, though not shown in FIG. 4, are managed as agent status information 33a (see FIG. 3) indicating by means of a flag "processing" that a thread is assigned to an agent and is processed. In the embodiment, the flag "processing" is used as one example of process information, and the agent control section 33 is provided as one example of the third control section that controls the process information.

The memory control section 34 reads data on an agent 21 from the database 10 into the cache 20. When data on all the agents 21 cannot be stored in the cache 20, an "agent swap process" of writing data on some agents 21 into the database 10 and reading the data therefrom as needed is carried out. At this time, it is necessary to determine which agents 21 are to be placed in the cache 20 and which agents 21 are to be placed in the database 10. While the determination may be made based on an LRU (Least Recently Used) system, for example, agents 21 whose status is "processing" are left in the cache 20 and not written out in the database 10 in the embodiment. According to the embodiment, the memory control section 34 is provided as one example of the control section that controls a specific agent so that it is not deleted from the second storage section.

When receiving information indicating transmission of a one-directional message from a thread, the scheduler 35 inquires the ATC control section 40 if the agent ID of a destination agent for the message is registered in the agent list 42. When the agent ID is not registered, the scheduler 35 causes the destination agent to participate in a transaction, and instructs the thread to store the message in the intra-transaction message queue 43. When receiving information indicating termination of a message process from a thread, the scheduler 35 determines an agent 21 to be processed next, acquires a corresponding message from the intra-transaction message queue 43, and transfers the message to the thread. In the embodiment, the scheduler 35 is provided as one example of the determining section that determines whether to continue or terminate a transaction.

The thread control section 36 has a plurality of threads to be used for a message process on an agent 21. Each thread acquires an agent 21 and a message to be processed next from the scheduler 35, and calls a message process logic (message handler) of the agent 21. When the process is completed, the thread acquires a next agent 21 and message from the scheduler 35. This thread control system is generally called "thread pool". In the embodiment, the thread control section 36 is provided as one example of the second control section that controls threads.

The communication section 37 performs message exchange with an external component when the entire environments of the agent 21 is constructed by a plurality of execution environment clusters, the communication section 37 is used for message exchange with other execution environments.

The ATC control section 40 controls ATCs generated by the number of threads or the number of transactions. The ATC 41 is generated for each thread, and includes an agent list 42 and an intra-transaction message queue 43. The ATC 41 is realized by, for example, an object in Java®, and is generated as follows. First, an ATC class is defined. At this time, the ATC class is made to have an agent list 42 and an intra-transaction message queue 43. Then, when an agent 21 starts a cooperative transaction during a message process, an ATC instance is generated. This ATC instance has an agent list 42 and an intra-transaction message queue 43 corresponding to the cooperative transaction. Then, the agent 21 adds itself to the agent list 42. When the ATC 41 already exists, on the other hand, it becomes an error. As mentioned earlier, the agent list 42 stores a list of agent IDs, and the intra-transaction message queue 43 is a queue to temporarily store one-directional messages in a transaction.

In the embodiment, the agent list 42 is used as one example of agent information, the intra-transaction message queue 43 is used as one example of status information, and the ATC control section 40 is provided as one example of the first control section that controls the agent information and status information.

Next, the operation of the agent executing apparatus 30 according to the embodiment will be described. Because the scheduler 35 controls the individual functions of the agent executing apparatus 30 to realize the general operation, the following description will be focused on the operation of the scheduler 35. As mentioned above, types of messages to be transmitted by agents 21 are either one-directional message or request reply message. Therefore, the following description will be given on a process relating, to a one-directional message and a process relating to a request reply message separately.

[Process Relating to One-Directional Message]

First, the scheduler 35 receives information indicating initiation of a transaction from a thread. Then, the scheduler 35 determines an agent 21 to be processed first (hereinafter referred to as "initial agent"), transfers a corresponding message to the thread, and instructs the thread to call a message handler for the initial agent. As a result, the thread is assigned to the initial agent, which starts a transaction. The operation of the scheduler 35 when a transaction starts will be described in detail later.

Suppose that thereafter, an agent 21 currently running (regardless of whether it is an initial agent or an agent which has directly or indirectly received a message transmitted from the initial agent) is caused to transmit a one-directional message. Then, the thread assigned to the agent 21 transmits information indicating the transmission of the one-directional message to the scheduler 35.

Figure 5:
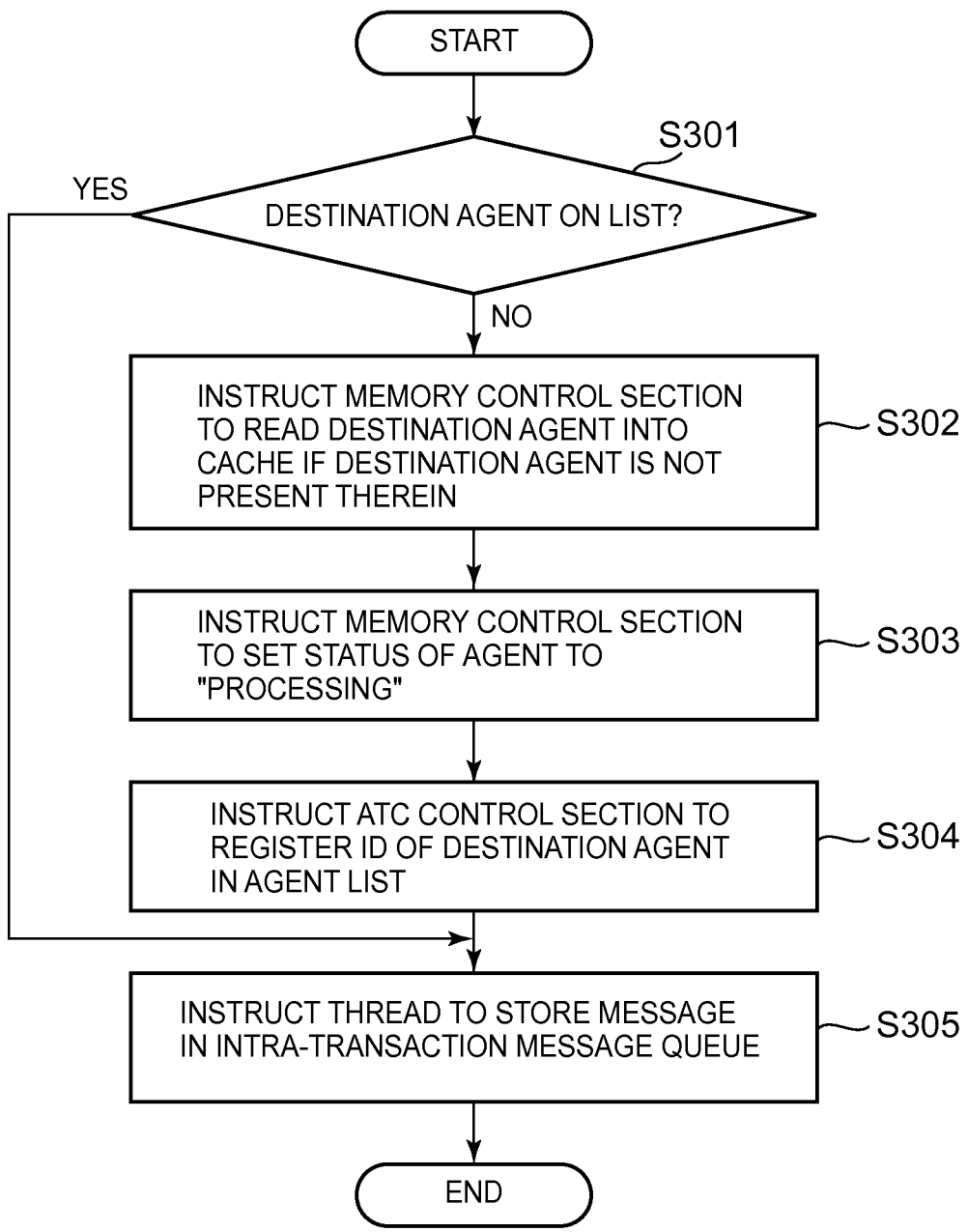
FIG. 5 is a flowchart illustrating an operational example of a scheduler when receiving information indicating transmission of a one-directional message according to the embodiment of the present invention.

FIG. 5 is a flowchart illustrating an operational example of the scheduler 35 when receiving this information. It is to be noted that identification information of a thread is transmitted therefrom. In this example, a "thread ID" is used as thread identification information.

When receiving information indicating transmission of a one-directional message, the scheduler 35 inquires the ATC control section 40 to determine whether the agent ID of a destination agent designated as the destination for the one-directional message is present in the agent list 42 (step 301).

When it is determined that the agent ID of the destination agent is present in the agent list 42, the flow goes to step 305. When it is determined that the agent ID of the destination agent is not present in the agent list 42, the scheduler 35 performs a process of causing the destination agent to participate in a transaction.

First, the scheduler 35 inquires the memory control section 34 to check if the destination agent is present in the cache 20, and, if not present, reads the destination agent from the database 10 and adds the destination agent to the cache 20 (step 302). Accordingly, the memory control section 34 performs the instructed operation to place the destination agent in the cache 20.

Next, the scheduler 35 instructs the agent control section 33 to set the agent status information 33a of the destination agent to "processing" (step 303). As a result, the agent control section 33 updates the agent status information 33a of the destination agent to "processing". If the agent status information 33a is already "processing" when concurrent parallel processing of an agent 21 is not permitted, it is considered that the agent 21 is participating in another transaction. Therefore, the scheduler 35 waits until the status is released.

Then, the scheduler 35 instructs the ATC control section 40 to add the agent ID of the destination agent to the agent list 42 (step 304). Accordingly, the ATC control section 40 registers the agent ID of the destination agent in the agent list 42.

When the destination agent participates in the transaction through those processes, the scheduler 35 instructs the thread to store a one-directional message to be transmitted into the intra-transaction message queue 43 (step 305). As a result, the thread stores the one-directional message in the intra-transaction message queue 43.

Suppose that the agent 21 currently running has terminated a message process. Then, the thread assigned to the agent 21 informs the scheduler 35 of information indicating that the agent 21 will terminate the process.

Figure 6:
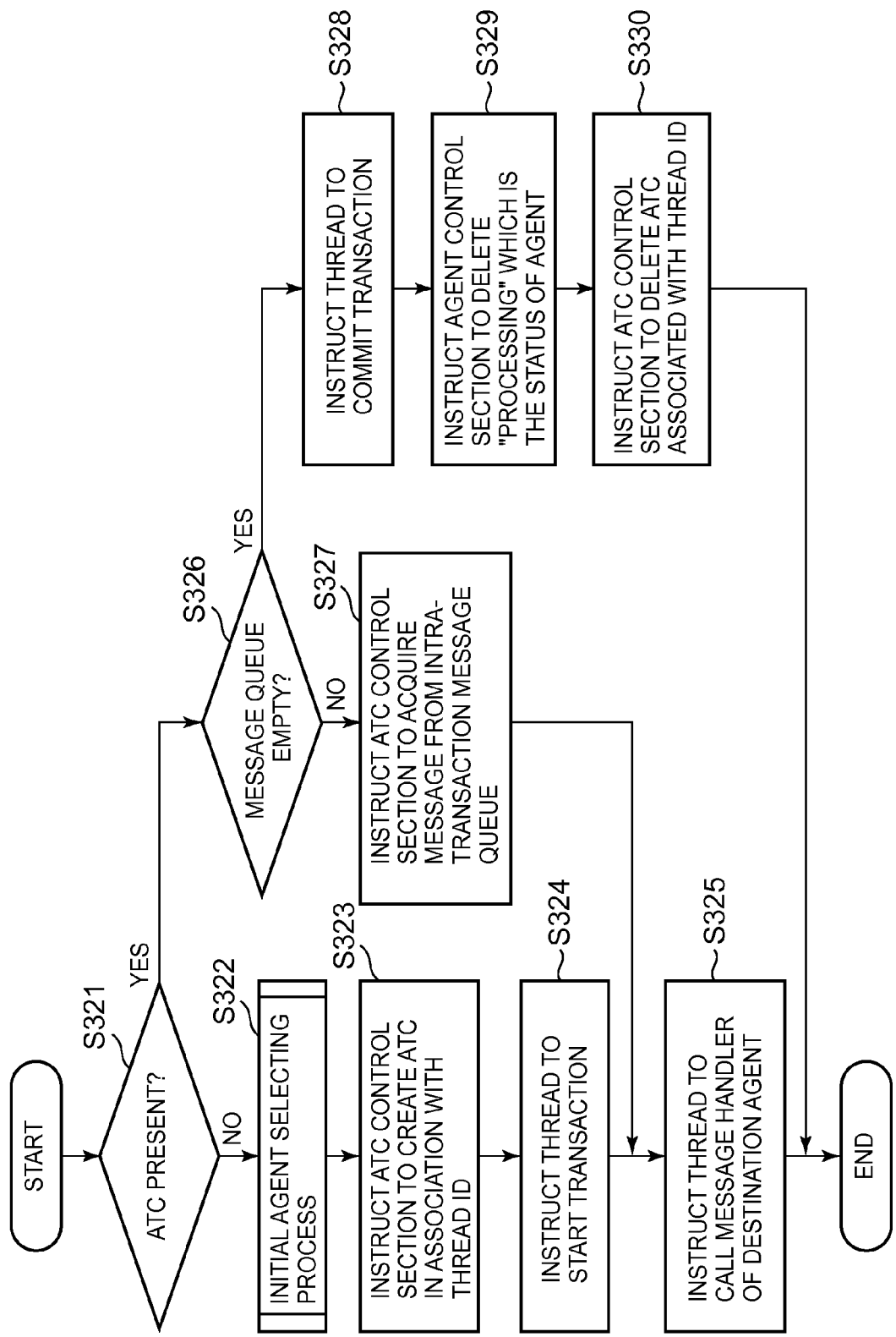
FIG. 6 is a flowchart illustrating an operational example of the scheduler when receiving information indicating initiation of a transaction or indicating that an agent will terminate a process according to the embodiment of the present invention.

FIG. 6 is a flowchart illustrating an operational example of the scheduler 35 when receiving this information. While this operation determines an agent 21 to be processed next when the processing of one agent 21 is terminated, it is common to the operation of determining an initial agent at the time of starting a transaction. In this respect, FIG. 6 also shows an operational example when the scheduler 35 receives information indicating initiation of a transaction. It is assumed that a thread transmits thread identification information at this time. A "thread ID" is also used as thread identification information.

When receiving, from a thread, information indicating initiation of a transaction or information indicating that an agent 21 will terminate a process, the scheduler 35 first inquires the ATC control section 40 to determine whether there is an ATC corresponding to the thread ID (step 321). When it is determined that the ATC is not present, which is a case where information indicating initiation of a transaction is received, the scheduler 35 performs a process of starting a transaction.

First, the scheduler 35 performs an initial agent selecting process to be described later (step 322). Next, the scheduler 35 instructs the ATC control section 40 to create an ATC in association with the thread ID (step 323). Accordingly, the ATC control section 40 creates an ATC in association with the thread ID. At this time, the ATC control section 40 registers the agent ID of the agent 21 which attempts to start the transaction in the agent list 42.

Then, the scheduler 35 instructs the thread to start the transaction (step 324). The scheduler 35 transfers a message to be processed by the agent 21 selected in step 322 to the thread, and instructs the thread to call a message handler for the agent 21 (step 325). Accordingly, the thread is assigned to the agent 21, the transaction is started, and the agent 21 processes a message.

When it is determined in step 321 that the ATC is present, on the other hand, in which case information indicating that the agent 21 will terminate the process is received, the scheduler 35 performs a process of determining an agent 21 to be processed next.

First, the scheduler 35 inquires the ATC control section 40 to determine whether the intra-transaction message queue 43 is empty (whether it is in a state of having no message) (step 326).

When it is determined that the intra-transaction message queue 43 is not empty, the scheduler 35 instructs the ATC control section 40 to acquire a message from the intra-transaction message queue 43 (step 327). As a result, the ATC control section 40 acquires a message from the intra-transaction message queue 43, and transfers the message to the scheduler 35.

The scheduler 35 then transfers the message to the thread and instructs the thread to call a message handler for the agent 21 (step 325). Accordingly, the thread is assigned to the agent 21, which processes the message.

When it is determined in step 326 that the intra-transaction message queue 43 is empty, it is a case where although one agent 21 tends to terminate the process and, thus a thread requests selection of an agent 21 to be processed next, a message to be processed is not present in the intra-transaction message queue 43. What is more, the thread does not concurrently execute a plurality of agents 21 in parallel, so that there is no agent 21 in operation at this point of time. Therefore, it is understood that processing of all the agents 21 is complete and the transaction can be terminated.

In this case, the scheduler 35 first instructs the thread to commit the transaction (step 328). As a result, the thread commits the transaction. The committing process is realized by calling the committing process of the transaction processing mechanism in the agent execution environment.

Next, the scheduler 35 instructs the agent control section 33 to delete "processing" in the agent status information 33a (step 329). As a result, the agent control section 33 deletes "processing" from the agent status information 33a.

Finally, the scheduler 35 instructs the ATC control section 40 to delete the ATC associated with the thread ID (step 330). As a result, the ATC control section 40 deletes the ATC associated with the thread ID.

The initial agent selecting process of step 322 in FIG. 6 will be described below.

Figure 7:
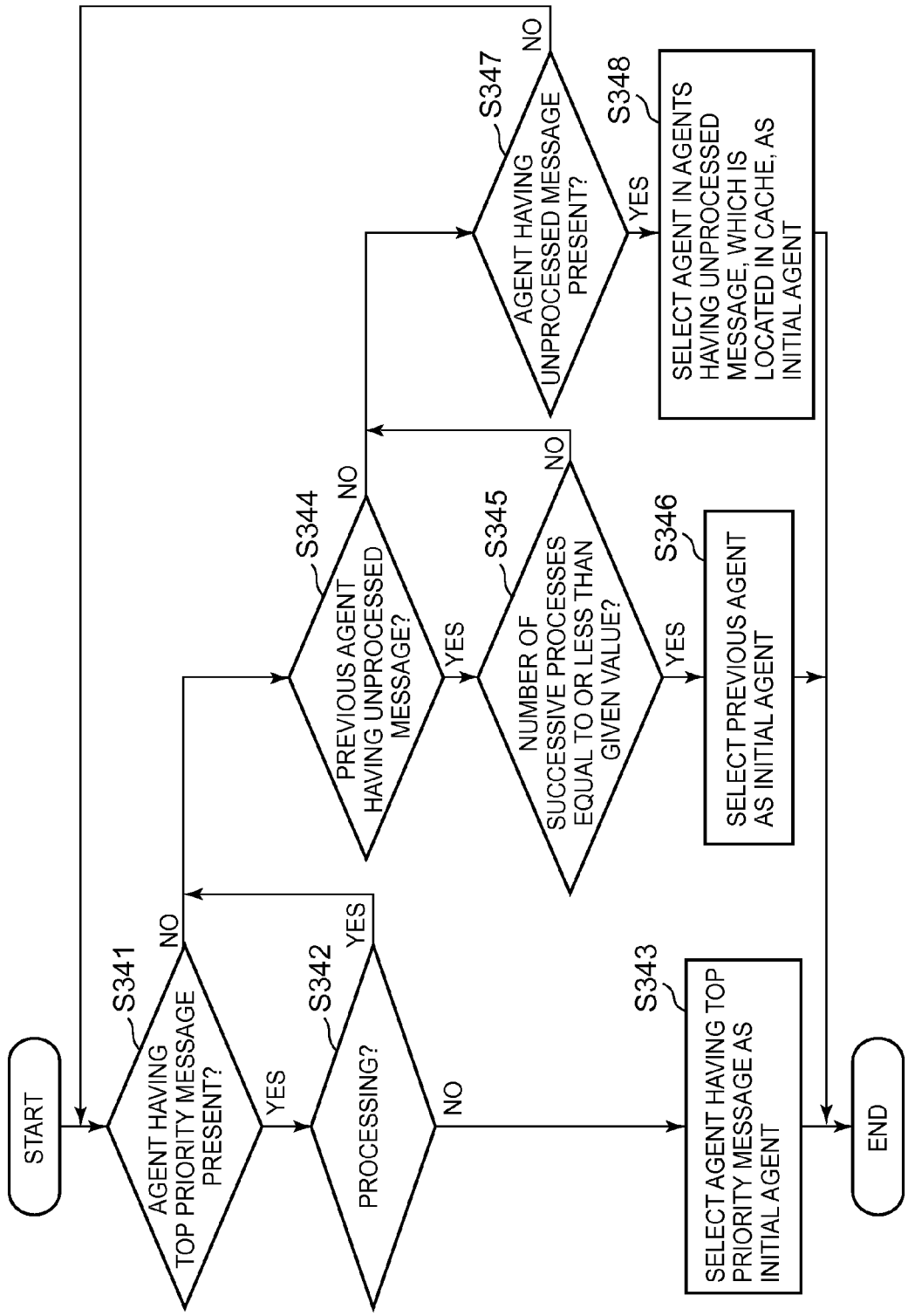
FIG. 7 is a flowchart illustrating an operational example of an initial agent selecting process according to the embodiment of the present invention.

FIG. 7 is a flowchart illustrating an operational example of the initial agent selecting process.

First, the scheduler 35 determines whether an agent 21 having the top priority message is present (step 341). When an agent 21 having the top priority message is present, the scheduler 35 inquires the agent control section 33 to determine whether the agent status information 33a of the agent 21 is "processing" (step 342). When the agent status information 33a of the agent 21 is not "processing", the scheduler 35 selects the agent 21 as an initial agent (step 343).

When it is determined in step 341 that there is no agent 21 having the top priority message and when it is determined in step 342 that the agent status information 33a is "processing", the flow goes to a next selection process.

That is, the scheduler 35 determines whether there is a message in the message queue 32 of the agent 21 which has been processing previously (step 344). When there is a message in the message queue 32 of the agent 21 which has been processing previously, the scheduler 35 determines whether the number of successive processes of the agent 21 is equal to or less than a given value (step 345). When the number of successive processes of the agent 21 is equal to or less than the given value, the scheduler 35 selects the agent 21 as an initial agent (step 346).

When it is determined in step 344 that there is no message in the message queue 32 of the agent 21 which has been processing previously, and when it is determined in step 345 that the number of successive processes of the agent 21 is not equal to or less than the given value, the flow goes to a next selection process.

The scheduler 35 determines whether there is an agent 21 having an unprocessed message (step 347). When there is an agent 21 having an unprocessed message, if there is an agent 21 placed in the cache 20, the scheduler 35 selects the agent 21 by priority, whereas if there is no agent 21 placed in the cache 20, the scheduler 35 selects an agent 21 placed in the database 10 (step 348).

When it is determined in step 347 that there is no agent 21 having an unprocessed message, the flow returns to step 341 to repeat the sequence of processes until a selectable agent 21 appears.

In the operational example, in steps 302 to 304 in FIG. 5, i.e., before a thread stores a one-directional message in the intra-transaction message queue 43, it is checked if the destination agent is participating in a transaction, and, if not, a process of causing the destination agent to participate is performed. However, the timing of executing the process is not limited to this particular timing. For example, the process may be executed directly after step 326 in FIG. 6, i.e., when a message is acquired from the intra-transaction message queue 43.

[Process Relating to Request Reply Message]

First, the scheduler 35 receives information indicating initiation of a transaction from a thread. Then, the scheduler 35 determines an initial agent, transfers a corresponding message to the thread, and instructs the thread to call a message handler for the initial agent. As a result, the thread is assigned to the initial agent, which starts a transaction. Since the operation of the scheduler 35 when a transaction starts is the same as steps 322 to 325 in FIG. 6, the detailed description will not be given.

Suppose that thereafter, an agent 21 currently running (regardless of whether it is an initial agent or an agent which has directly or indirectly received a message transmitted from the initial agent) is caused to transmit a request reply message. Then, the thread assigned to the agent 21 transmits information indicating the transmission of the request reply message to the scheduler 35.

Figure 8:
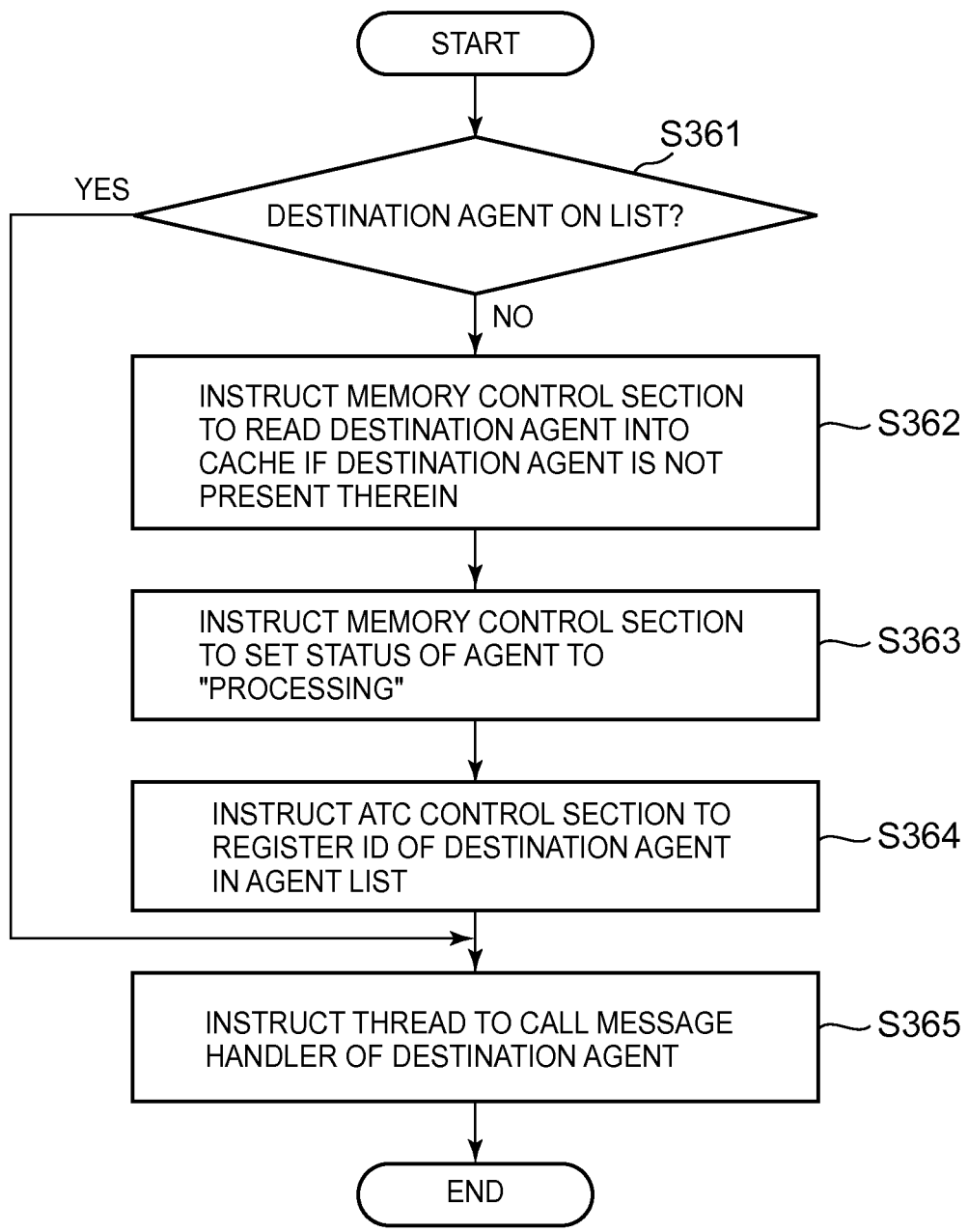
FIG. 8 is a flowchart illustrating an operational example of the scheduler when receiving information indicating transmission of a request reply message according to the embodiment of the present invention.

FIG. 8 is a flowchart illustrating an operational example of the scheduler 35 when receiving this information. It is to be noted that identification information of a thread is transmitted therefrom. In this example, a "thread ID" is used as thread identification information.

When receiving information indicating transmission of a request reply message, the scheduler 35 inquires the ATC control section 40 to determine whether the agent ID of a destination agent designated as the destination for the request reply message is present in the agent list 42 (step 361).

When it is determined that the agent ID of the destination agent is present in the agent list 42, the flow goes to step 365. When it is determined that the agent ID of the destination agent is not present in the agent list 42, the scheduler 35 performs a process of causing the destination agent to participate in a transaction.

First, the scheduler 35 inquires the memory control section 34 to check if the destination agent is present in the cache 20, and, if not present, reads the destination agent from the database 10 and adds the destination agent to the cache 20 (step 362). Accordingly, the memory control section 34 performs the instructed operation to place the destination agent in the cache 20.

Next, the scheduler 35 instructs the agent control section 33 to set the agent status information 33a of the destination agent to "processing" (step 363). As a result, the agent control section 33 updates the agent status information 33a of the destination agent to "processing". If the agent status information 33a is already "processing" when concurrent parallel processing of an agent 21 is not permitted, it is considered that the agent 21 is participating in another transaction. Therefore, the scheduler 35 waits until the status is released.

Then, the scheduler 35 instructs the ATC control section 40 to add the agent ID of the destination agent to the agent list 42 (step 364). Accordingly, the ATC control section 40 registers the agent ID of the destination agent in the agent list 42.

When the destination agent participates in the transaction through those processes, the scheduler 35 instructs the thread to call a message handler of the destination agent (step 365). As a result, the thread transmits the request reply message to the destination agent.

The detailed description of the embodiment has been given above. In the foregoing description, the agent list 42 which is a list of agent IDs is used as a mechanism of making a list of information specifying agents 21 merely as one example. For example, an agent list which is a list of reference information such as addresses of agents 21 may be used. In addition, while the intra-transaction message queue 43 is used as the counter mechanism of counting one-directional messages in a transaction, a counter which merely stores the number of messages may be used. Alternatively, information indicating if an unprocessed one-directional message is present in a transaction, or information indicating the process status of a one-directional message in a transaction may be used.

According to the embodiment, as apparent from the above, agents 21 which participate in a cooperative transaction are processed in order by a single thread. This overcomes the above-described "thread problem".

In the embodiment, when the counter value for one-directional messages in a transaction becomes zero, it is determined that a transaction is completed, and, if not, it is determined that a transaction is not completed. This overcomes the above-described "transaction completion problem".

The use of the foregoing configuration can allow a single transaction process by a plurality of agents to be described easily. This makes the program simpler and reduces the number of development steps. In addition, the maintainability is improved.

Figure 9:
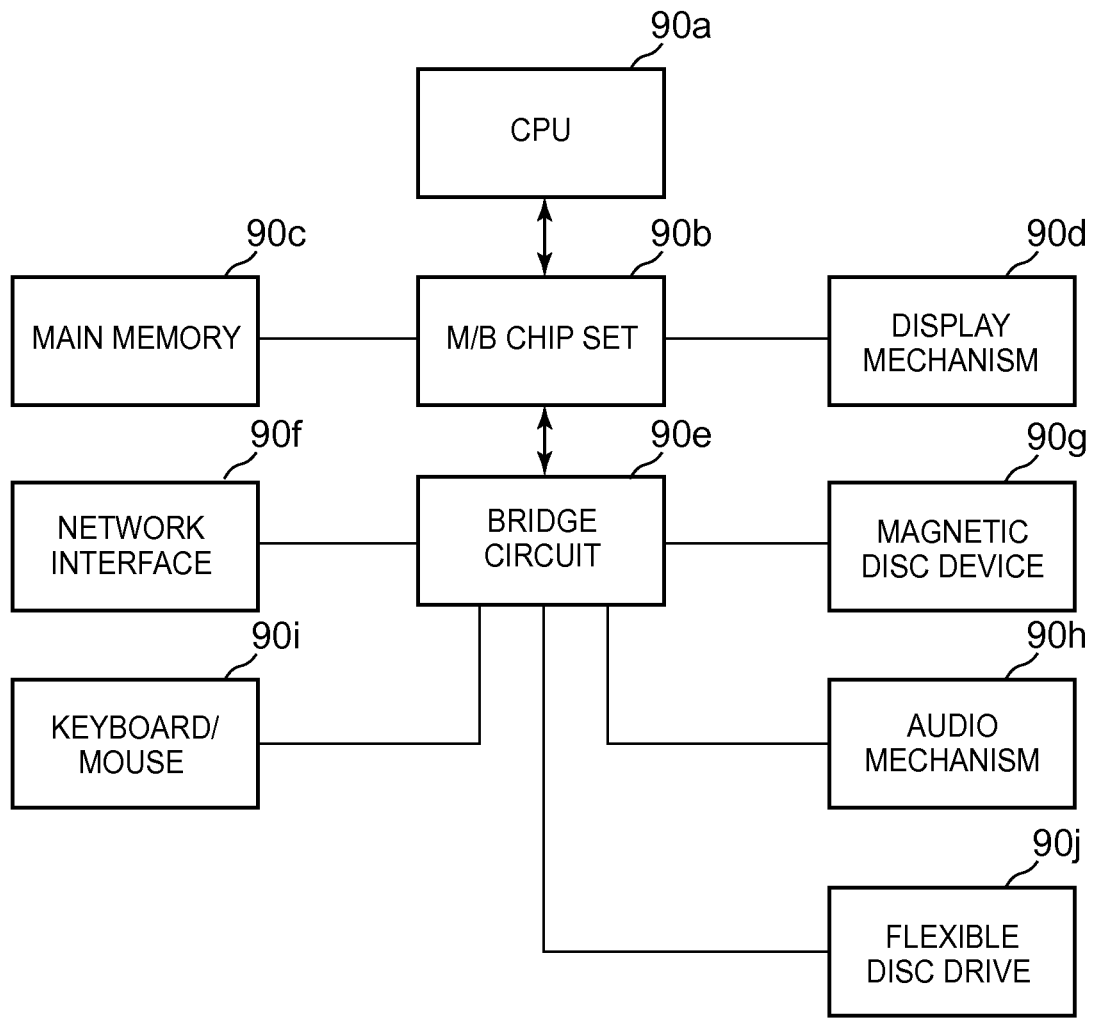
FIG. 9 is a diagram showing a hardware configuration of a computer to which the embodiment of the present invention is adaptable.

Finally, the hardware configuration of a suitable computer to which the embodiment is adapted will be described. FIG. 9 is a diagram showing one example of the hardware configuration of such a computer. As illustrated, the computer includes a CPU (Central Processing Unit) 90a which is arithmetic operation means, a main memory 90c connected to the CPU 90a via an M/B (Mother Board) chip set 90b, and a display mechanism 90d also connected to the CPU 90a via the M/B chip set 90b. The M/B chip set 90b is connected with a network interface 90f, a magnetic disc device (HDD) 90g, an audio mechanism 90h, a keyboard/mouse 90i and a flexible disc drive 90j via a bridge circuit 90e.

In FIG. 9, the individual components are connected together by buses. For example, the CPU 90a and the M/B chip set 90b are connected together, and the M/B chip set 90b and the main memory 90c are connected together, by a CPU bus. While the M/B chip set 90b may be connected to the display mechanism 90d by an AGP (Accelerated Graphics Port), when the display mechanism 90d includes a video card compatible with PCI Express, the M/B chip set 90b and the video card are connected together by a PCI Express (PCIe) bus. For connection to the bridge circuit 90e, PCI Express, for example, can be used for the network interface 90f. With regard to the magnetic disc device 90g, for example, serial ATA (AT Attachment), parallel transfer ATA, or PCI (Peripheral Components Interconnect) can be used. Further, USB (Universal Serial Bus) can be used for the keyboard/mouse 90i and the flexible disc drive 90j.

The present invention may be realized entirely by hardware, or entirely by software. The present invention may also be realized by both hardware and software. The present invention can be realized as a computer, a data processing system, or a computer program. The computer program can be provided in the form of a computer readable medium where it is stored. Possible media are electronic, magnetic, optical, electromagnetic, infrared and semiconductor systems (equipment or device), or a transmittable medium. Examples of the computer readable media include a semiconductor, solid state memory device, magnetic tape, detachable computer diskette, random access memory (RAM), read only memory (ROM), rigid magnetic disc, and optical disc. Examples of optical discs at present include a compact disc-read only memory (CD-ROM), compact disc-read/write (CD-R/W) and DVD.

While the embodiment of the present invention has been described above, the technical scope of the invention is not limited to the scope of the above-described embodiment. It should be apparent to those skilled in the art that various changes and improvements can be made to the embodiment without departing from the scope and spirit of the invention.

What is claimed is:

1. A method for selecting an initial agent for an agent transaction context (ATC), the ATC configured to process a transaction utilizing a plurality of active agents in a multiagent system using a computing device comprising:
   causing the computing device to determine whether an agent having a top priority message is present, wherein the agent is one of the plurality of active agents in the multiagent system;
   if the agent having the top priority message is present, causing the computing device to determine whether the agent having the top priority message is processing; and
   if the agent having the top priority message is not processing, causing the computing device to select the agent having the top priority message as the initial agent for the ATC, wherein the ATC includes at least an agent list and an intra-transaction message queue, wherein the agent list includes at least some of the plurality of active agents required for executing a plurality of threads, wherein the intra-transaction message queue is configured to store a plurality of one-directional messages, and wherein the plurality of one-directional messages are associated with the transaction.

2. The method of claim 1, further comprising:
   if the agent having the top priority message is not present, causing the computing device to determine whether any of the plurality of active agents has been processing previously; and
   if any of the plurality of active agents has been processing previously, causing the computing device to select a previously processing agent as the initial agent for the ATC.

3. The method of claim 2, further comprising:
   before the causing the computing device to select the previously processing agent, causing, the computing device to determine whether a number of successive processes of the previously processing agent exceeds a given value; and
   if the number exceeds the given value, selecting another of the plurality of active agents.

4. The method of claim 3, wherein another of the plurality of active agents comprises:
   causing the computing device to determine whether any of the plurality of active agents has an unprocessed message; and
   if any of the plurality of active agents has an unprocessed message, causing the computing device to select an agent having the unprocessed message as the initial agent for the ATC.

5. The method of claim 1, further comprising:
   if the agent having the top priority message is processing, causing the computing device to determine whether any of the plurality of active agents has been processing previously; and
   if any of the plurality of active agents has been processing previously, causing the computing device to select the previously processing agent as the initial agent for the ATC.

6. The method of claim 5, further comprising:
   before the causing the computing device to select the previously processing agent, causing the computing device to determine whether a number of successive processes of the previously processing agent exceeds a given value; and
   if the number exceeds the given value, selecting another of the plurality of active agents.

7. The method of claim 6, wherein selecting another of the plurality of active agents comprises:
   causing the computing device to determine whether any of the plurality of active agents has an unprocessed message; and
   if any of the plurality of active agents has an unprocessed message, causing the computing device to select an agent having the unprocessed message as the initial agent for the ATC.

8. A computing device program product for selecting an initial agent for an agent transaction context (ATC), the ATC configured to process a transaction utilizing a plurality of active agents in a multiagent system using a computing device comprising:
   a non-transitory computer readable medium;
   first programmatic instructions for causing the computing device to determine whether an agent having a top priority message is present, wherein the agent is one of the plurality of active agents in the multiagent system;
   if the agent having the top priority message is present, second programmatic instructions for causing the computing device to determine whether the agent having the top priority message is processing; and
   if the agent having the top priority message is not processing, third programmatic instructions for causing the computing device to select the agent having the top priority message as the initial agent for the ATC, wherein the ATC includes at least an agent list, and an intra-transaction message queue, wherein the agent list includes at least some of the plurality of active agents required for executing a plurality of threads, wherein the intra-transaction message queue is configured to store a plurality of one-directional messages, and wherein the plurality of one-directional messages are associated with the transaction.

9. The computing device program product of claim 8, further comprising:
   if the agent having the top priority message is not present, fourth programmatic instructions for causing the computing device to determine whether any of the plurality of active agents has been processing previously; and
   if any of the plurality of active agents has been processing previously, fifth programmatic instructions for causing the computing device to select a previously processing agent as the initial agent for the ATC.

10. The computing device program product of claim 9, further comprising:
    before the fifth programmatic instructions for causing the computing device to select the previously processing agent, sixth programmatic instructions for causing the computing device to determine whether a number of successive processes of the previously processing agent exceeds a given value; and if the number exceeds the given value, selecting another of the plurality of active agents.

11. The computing device program product of claim 10, wherein selecting another of the plurality of active agents comprises:

seventh programmatic instructions for causing the computing device to determine whether any of the plurality of active agents has an unprocessed message; and if any of the plurality of active agents has an unprocessed message, eighth programmatic instructions for causing the computing device to select an agent having the unprocessed message as the initial agent for the ATC.

12. The computing device program product of claim 8, further comprising:

if the agent having the top priority message is processing, tenth programmatic instructions for causing the computing device to determine whether any of the plurality of active agents has been processing previously; and if any of the plurality of active agents has been processing previously, eleventh programmatic instructions for causing the computing device to select the previously processing agent as the initial agent for the ATC.

13. The computing device program product of claim 12, further comprising:

before the eleventh programmatic instructions for causing the computing device to select the previously processing agent, twelfth programmatic instructions for causing the computing device to determine whether a number of successive processes of the previously processing agent exceeds a given value; and if the number exceeds the given value, selecting another of the plurality of active agents.

14. The computing device program product of claim 13, wherein selecting another of the plurality of active agents comprises: thirteenth programmatic instructions for causing the computing device to determine whether any of the plurality of active agents has an unprocessed message; and if any of the plurality of active agents has an unprocessed message, fourteenth programmatic instructions for causing the computing device to select an agent having the unprocessed message as the initial agent for the ATC.

* * * * *